United States Patent [19]
Sasaki et al.

[11] Patent Number: 5,516,878
[45] Date of Patent: May 14, 1996

[54] PROCESS FOR THE PRODUCTION OF AROMATIC POLYCARBONATE

[75] Inventors: Katsushi Sasaki; Wataru Funakoshi; Masumi Hirata; Masanori Abe; Hiroaki Kaneko, all of Iwakuni, Japan

[73] Assignee: Teijin Limited, Osaka, Japan

[21] Appl. No.: 386,086

[22] Filed: Feb. 9, 1995

[30] Foreign Application Priority Data

Feb. 10, 1994 [JP] Japan .................... 6-016186

[51] Int. Cl.⁶ .................... C08G 64/00
[52] U.S. Cl. .................... 528/199; 502/150; 502/152; 502/157; 502/158; 502/171; 502/200; 564/281; 528/196; 528/198; 528/200
[58] Field of Search .................... 502/150, 152, 502/157, 158, 171, 200; 564/281; 528/198, 196, 199, 200

[56] References Cited

U.S. PATENT DOCUMENTS

| | | | |
|---|---|---|---|
| 3,689,462 | 9/1972 | Maximovich | 528/371 |
| 4,330,665 | 5/1982 | Krimm et al. | 528/200 |
| 4,382,014 | 5/1983 | Sakai et al. | 252/356 |

FOREIGN PATENT DOCUMENTS

| | | |
|---|---|---|
| 0577849 | 1/1994 | European Pat. Off. . |
| 0594175 | 4/1994 | European Pat. Off. . |

OTHER PUBLICATIONS

Abstract of JP–62199618, Daicel Chem Ind KK, "Preparation of Polyester Carbonbate Used in Plastic Engineering", Feb. 27, 1986.

Abstract of JP–54063023, Mitsubishi Chem Ind KK, "Ester-exchanged Carbonate Production by Reacting in the Presence of a Tin Alkoxide", Oct. 26, 1977.

Primary Examiner—James J. Seidleck
Assistant Examiner—Terressa Mosley
Attorney, Agent, or Firm—Wenderoth, Lind & Ponack

[57] ABSTRACT

A process for the production of an aromatic polycarbonate, which comprises polycondensing an aromatic dihydroxy compound and a diaryl carbonate in the presence, as a polycondensation catalyst, of at least one alkali metal salt selected from the group consisting of alkali metal salts of ate-complexes of a metal element, which is silicon, germanium, stannum or plumbum, and alkali metal salts of oxoacids of said metal elements. The above aromatic polycarbonate is almost free from being colored, is also almost free from a decrease in polymerization degree when molded, and is further almost free from forming branches and insolubles.

23 Claims, No Drawings

PROCESS FOR THE PRODUCTION OF AROMATIC POLYCARBONATE

BACKGROUND OF THE INVENTION

1. Field of the Invention

The present invention relates to a process for the production of an aromatic polycarbonate. More specifically, it relates to a process for the production of a polycarbonate which is almost free from being colored, which is also almost free from a decrease in polymerization degree when molded, and which is further almost free from forming branches and insolubles.

2. Description of the Prior Art

A polycarbonate is widely used, since it is excellent in mechanical properties such as impact resistance and is also excellent in heat resistance and transparency. For producing this polycarbonate, there is known a method in which an aromatic dihydroxy compound such as bisphenol and phosgene are directly reacted (interfacial method) or a method in which an aromatic dihydroxy compound such as bisphenol and a diaryl carbonate such as diphenyl carbonate are reacted in an ester exchange reaction in a molten state (melt method).

Of the above methods, the method of producing a polycarbonate by reacting an aromatic dihydroxy compound and a diaryl carbonate in an ester exchange reaction is carried out as follows. In the presence of a catalyst selected from organic acid salts, inorganic acid salts, oxides, hydroxides, hydrides and alcoholates of metals, an aromatic dihydroxy compound and a diaryl carbonate are reacted in an ester exchange reaction while they are melted by heating them, for example, up to a final temperature of 250° to 330° C. under reduced pressure.

This method (melt method) is advantageous over the above interfacial method in that a polycarbonate can be produced at a low cost. However, the problem with this method is that the so-obtained polycarbonate has a poor hue since the polymer is exposed to a high temperature for a long period of reaction time.

JP-A-62-199618 (the term "JP-A" as used herein means an "unexamined published Japanese patent application") discloses a method of producing a polyester carbonate, in which a diaryl carbonate and an aromatic dicarboxylic acid alkyl ester are reacted in an ester exchange reaction in the presence of a catalyst while they are melted.

As the catalyst, the above JP-A-62-199618 describes (1) alkali metals and compounds thereof, (2) compounds of elements belonging to the Groups II (group 2) and III (group 13) of the periodic table and (3) compounds of metals other than the above, such as germanium, tin, lead, zinc and cadmium. Examples of JP-A-62-199618 only disclose methods of producing polyester carbonates in the presence of a tin compound alone.

JP-A-54-63023 discloses a method of reacting a hydroxy compound and carbonate in an ester exchange reaction in the presence of a tin alkoxide of the formula,

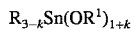

wherein R is a hydrocarbon residue, $R^1$ is a hydrocarbon residue and k is an integer of 0 to 2, provided that two $R^1$s may represent one alkylene group.

As the tin alkoxide, the above JP-A-54-63023 describes tin trialkylalkoxide, tin dialkyldialkoxide, tin diaryldialkoxide and tin alkyltrialkoxide.

JP-A-57-2334 discloses a method of producing an aromatic polycarbonate, in which a dihydric phenol and dialkyl carboxylate are reacted in an ester exchange reaction in the presence of an organic tin (IV) compound (a) and a monohydric phenol (b).

The above organic tin (IV) compound includes a compound of the following formula,

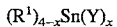

wherein Y is O—CO—$R^2$, OH or $OR^2$ group in which $R^2$ is $C_{1-12}$ alkyl, $C_{5-12}$ aryl or $C_{7-13}$ aralkyl, $R^1$ has the same meaning as that of $R^2$, and x is an integer of 1 to 3, di($C_{1-12}$ alkyl)SnO and a compound of the following formula,

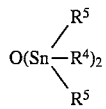

wherein $R^4$ is has the same meaning as that of $R^2$, and $R^5$ either has the same meaning as that of $R^2$ or represents an $OR^2$ group.

Examples of JP-A-57-2234 use ethyl tin triisooctylate and ethyl tin tributoxide.

JP-A-6-145334 discloses a method of producing a polycarbonate, in which an aromatic diol compound and a carbonic acid diester are melt-polycondensed in the presence of an organic silicon compound of the formula,

wherein each of R and $R^1$ is independently a $C_{1-20}$ hydrocarbon group and n is an integer of 0, 1, 2 or 3.

As an ester exchange catalyst used for the above melt-polycondensation, JP-A-6-145334 discloses acetates, carbonates, borates, nitrates, oxides, hydroxides, hydrides and alcoholates of metals such as alkali metals, alkaline earth metals, tin, nickel and titanium. In Examples, JP-A-6-145334 uses dibutyl tin oxide (Examples 1–8) and dibutyl tin dilaurate (Example 9).

JP-A-5-202180 discloses linear polycarbonates having a branch parameter G of 0.8 to 1.0. The branch parameter G is defined as a value obtained by dividing an intrinsic viscosity [η] in methylene chloride at 20° C. by the intrinsic viscosity [η]$_{lin}$ measured in methylene chloride at 20° C., of a linear polycarbonate having the same average molecular weight measured by a light scattering method. It can be therefore said that the smaller the value G is, the greater the branching degree is.

Concerning alkali metal compounds and alkaline earth metal compounds known as an ester exchange catalyst, JP-A-5-202180 describes that these compounds have high activity as a catalyst but that, disadvantageously, a branched structure is formed by side reactions, a polycarbonate is partially insoluble in methylene chloride or a polycarbonate is colored to excess.

JP-A-5-202180 therefore discloses that the catalyst can be selected from compounds containing elements of Group IIb (group 12) of the periodic table such as zinc and cadmium, compounds containing elements of Group IVb (group 14) of the periodic table such as silicon, germanium, tin and lead and compounds containing elements of Group Vb (group 15) of the periodic table such as antimony and bismuth. Specifically, JP-A-5-202180 describes silicon oxide. germanium oxide, germanium hydroxide and tin (IV) oxide.

SUMMARY OF THE INVENTION

It is an object of the present invention to provide a novel process for the production of an aromatic polycarbonate by a melt-polycondensation method.

It is another object of the present invention to provide a process for the production of an aromatic polycarbonate which is free of coloring and which has reduced branching and reduced insolubles, by a melt-polycondensation method.

It is further another object of the present invention to provide a process for the production of an aromatic polycarbonate which is prevented from causing side reactions, such as a branch-formation, in molding and which is also prevented from burning, coloring (yellowing), insolubilization, formation of undesirable particles or a decrease in molecular weight.

It is still further another object of the present invention to provide a process for the production of the above polycarbonate at a high polymerization rate with high productivity.

Further, it is another object of the present invention to provide a catalyst or a catalyst composition for producing the above aromatic polycarbonate.

Other objects and advantages of the present invention will be apparent from the following description.

According to the present invention, the above objects and advantages of the present invention are achieved by a process for the production of an aromatic polycarbonate, which comprises polycondensing an aromatic dihydroxy compound and a diaryl carbonate in the presence, as a polycondensation catalyst, of at least one alkali metal salt selected from the group consisting of alkali metal salts of ate-complexes of metal elements of the group 14 of the periodic table and alkali metal salts of oxoacids of said metal elements, the above metal elements of the group 14 of the periodic table being silicon, germanium, stannum (tin) and plumbum (lead).

DETAILED DESCRIPTION OF THE INVENTION

As described above, the present invention is a process for producing an aromatic polycarbonate by polycondensing an aromatic dihydroxy compound and a diaryl carbonate.

As an aromatic dihydroxy compound, for example, preferred is a compound of the formula (I),

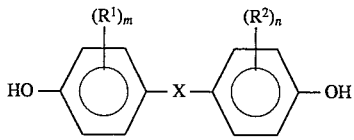

wherein X is

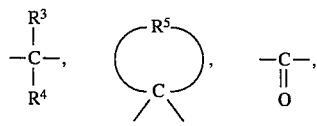

—O—, —S—, —SO—, —SO$_2$— or a single bond, each of $R^1$ and $R^2$ is independently a halogen atom, a hydrocarbon group having 1 to 12 carbon atoms, a hydrocarbon-O or —S group having 1 to 12 carbon atoms, each of $R^3$ and $R^4$ is independently a hydrogen atom, a halogen atom or a hydrocarbon group having 1 to 12 carbon atoms, $R^5$ is a hydrocarbon group having 4 to 20 carbon atoms, and each of m and n is independently an integer of 0 or 1 to 4.

In the formula (I), each of $R^1$ and $R^2$ is independently a halogen atom, a hydrocarbon group having 1 to 12 carbon atoms or a hydrocarbon-O or —S group having 1 to 12 carbon atoms. The halogen atom preferably includes chlorine and fluorine. The hydrocarbon group having 1 to 12 carbon atoms preferably includes an aliphatic hydrocarbon group having 1 to 12 carbon atoms and an aromatic hydrocarbon group having 6 to 12 carbon atoms. The aliphatic hydrocarbon group having 1 to 12 carbon atoms includes an alkyl group having 1 to 12 carbon atoms and an alkenyl group having 2 to 12 carbon atoms. These alkyl and alkenyl group may be linear or branched. The alkyl group includes methyl, ethyl, n-propyl, iso-propyl, n-butyl, sec-butyl, tert-butyl, pentyl, hexyl, octyl, decyl, undecyl and dodecyl. The alkenyl group includes ethenyl, propenyl, butenyl, pentenyl, decen-1-yl and cyclohexen-1-yl.

Further, the aromatic hydrocarbon group having 6 to 12 carbon atoms includes phenyl, tolyl, ethylphenyl, naphthyl, methylnaphthyl and biphenyl.

The hydrocarbon-O or —S group having 1 to 12 carbon atoms is selected from those which correspond to adducts of the above-specified hydrocarbons having 1 to 12 carbon atoms with an oxygen atom (O) or a sulfur atom (S). For example, the hydrocarbon-O or —S group preferably includes methoxy, ethoxy, hexyloxy, octyloxy, phenoxy, p-methylphenoxy, naphthyloxy, methylthio, ethylthio and phenylthio.

In the formula (I), each of m and n is independently an integer of 0 or 1 to 4. When m is 0, it means the absence of the substituent $R^1$. Similarly, when n is 0, it means the absence of the substituent $R^2$.

In the formula (I), X is

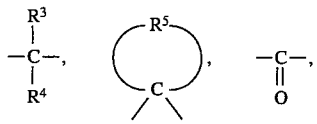

—S—, —SO—, —SO$_2$— or a single bond.

Each of the above $R^3$ and $R^4$ is independently a hydrogen atom, a halogen atom or a hydrocarbon group having 1 to 12 carbon atoms. The halogen atom and the hydrocarbon group having 1 to 12 carbon atoms include those specified with regard to $R^1$ and $R^2$.

Further, $R^5$ is a hydrocarbon group having 4 to 20 carbon atoms. This hydrocarbon group preferably includes divalent aliphatic hydrocarbon groups such as alkylene, alkenylene and fluorene groups. These alkylene and alkenylene groups may be linear or branched. The alkylene group includes tetramethylene, 1- or 2-methylpropylene and pentamethylene. The alkenylene group includes butenylene and pentenylene.

Examples of the compound of the formula (I) include bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butylphenyl)propane and 2,2-bis(4-hydroxy-3-chlorophenyl)propane; bis(hydroxyaryl)cycloalkanes such as 1,1-bis(4-hydroxyphenyl)cyclopentane, 1,1-bis(4-hydroxyphenyl)cyclohexane and 9,9-bis(4-hydroxyphenyl)fluorene; dihydroxyaryl ketones such as 4,4'-dihydroxydiphenyl ketone; dihydroxy aryl ethers such as 4,4'-hydroxydiphenyl ether and 4,4'-dihydroxy-3,3'-dimethylphenyl ether; dihydroxy diaryl sulfides such as 4,4'-dihydroxydiphenylsulfide and 4,4'-dihydroxy-3,3'-dimethyldiphenylsulfide; dihydroxy diaryl sulfoxides such as 4,4'-dihydroxydiphenyl sulfoxide and 4,4'-dihydroxy-3,3-dimehyldiphenyl sulfoxide; dihydroxy diaryl sulfones such as 4,4'-dihydroxydiphenylsulfone and 4,4' -dihydroxy-3,3'-dimethyldiphenylsulfone; and 4,4'-dihydroxybiphenyls such as 4,4'-dihydroxybiphenyl.

Of the above dihydroxy compounds, preferred is 2,2-bis(4-hydroxyphenyl)propane (bisphenol-A). The above aromatic dihydroxy compounds may be used alone or in combination.

As a diaryl carbonate which is the other starting material to be reacted with the above aromatic dihydroxy compound, preferred is a di(substituted or nonsubstituted $C_{6-20}$ aryl) carbonate. The above substituent includes an alkyl group having 1 to 5 carbon atoms, an alkoxy group having 1 to 5 carbon atoms, an alkylthio group having 1 to 5 carbon atoms and a halogen atom.

The above diaryl carbonate includes, for example, diphenyl carbonate, ditolyl carbonate, bis(chlorophenyl)carbonate, bis(m-cresyl)carbonate, dinaphthyl carbonate, bis-(diphenyl)carbonate and bis(2-methoxyphenyl)carbonate. Of these diaryl carbonates, particularly preferred is diphenyl carbonate. These diaryl carbonates may be used alone or in combination. The amount of the diaryl carbonate per mole of the aromatic dihydroxy compound is generally 1.0 to 1.30 mol, preferably 1.01 to 1.20 mol.

The polycondensation catalyst used in the present invention is:

(a) an alkali metal salt of ate-complex of a metal element of the group 14 of the periodic table, or (b) an alkali metal salt of oxoacid of a metal element of the group 14 of the periodic table.

In this invention, the metal element of the group 14 of the periodic table is any one of silicon, germanium, tin and lead. That is, carbon is excluded.

The (a) alkali metal salt of ate-complex of a metal element of the group 14 of the periodic table is preferably selected from those of the following formula (II), $$M^1 M^2 X^1_p (OR^6)_q \qquad (II)$$

wherein $M^1$ is an alkali metal, $M^2$ is silicon, germanium, stannum (tin) or plumbum (lead), $X^1$ is an alkyl group having 1 to 20 carbon atoms, a cycloalkyl group having 5 to 20 carbon atoms or an aryl group having 6 to 20 carbon atoms, $R^6$ is an alkyl group having 1 to 20 carbon atoms, a cycloalkyl group having 5 to 20 carbon atoms or an aryl group having 6 to 20 carbon atoms, and each of p and q is an integer of 0 or 1 to 5, provided that p+q equals 3 or 5.

In the above formula (II), $M^1$ is an alkali metal, and it includes lithium, sodium, potassium, rubidium and cesium. Of these alkali metals, sodium is particularly preferred.

$M^2$ is silicon, germanium, tin or lead. Of these, germanium and stannum (tin) are preferred.

$X^1$ is an alkyl group having 1 to 20 carbon atoms, a cycloalkyl group having 5 to 20 carbon atoms or an aryl group having 6 to 20 carbon atoms.

The alkyl group having 1 to 20 carbon atoms may be linear or branched, and it includes methyl, ethyl, n-propyl, i-propyl, n-butyl, sec-butyl, i-butyl, t-butyl, n-pentyl, hexyl, octyl, nonyl, decyl, dodecyl, hexadecyl, octadecyl and eicosyl. Of these, preferred is an alkyl group having 1 to 10 carbon atoms.

The cycloalkyl group having 5 to 20 carbon atoms includes cyclopentyl, cyclohexyl, methylcyclopentyl, 4-methylcyclohexyl, 3,4-dimethylcyclohexyl and decahydronaphthyl. Of these, preferred is a cycloalkyl group having 5 to 10 carbon atoms.

The aryl group having 6 to 10 carbon atoms includes phenyl, tolyl, xylyl, naphthyl and biphenyl. Of these, phenyl is preferred.

Further, $R^6$ is an alkyl group having 1 to 20 carbon atoms, a cycloalkyl group having 5 to 20 carbon atoms or an aryl group having 6 to 20 carbon atoms. Examples and preferred examples of these groups are those specified with regard to $X^1$.

In the formula (II), each of p and q is an integer of 0 or 1 to 5 on condition that p+q equals 3 or 5. Therefore, when p+q is 5, p and q can represent any integer of 0 or 1 to 5. When p+q is 3, however, p and q represent an integer of 0 or 1 to 3.

When p is 0, the above formula (II) is replaced by the following formula (II)-1, $$M^1 M^2 (OR^6)_r \qquad (II)\text{-}1$$

wherein $M^1$, $M^2$ and $R^6$ are as defined in the formula (II), and r is 3 or 5.

When q is 0, the above formula (II) is replaced by the following formula (II)-2, $$M^1 M^2 X^1_s \qquad (II)\text{-}2$$

wherein $M^1$, $M^2$ and $X^1$ are as defined in the formula (II), and s is 3 or 5.

When none of p and q is 0, the above formula (II) is replaced by the following formula (II)-3, $$M^1 M^2 X^1_t (OR^6)_u$$

wherein $M^1$, $M^2$, $X^1$ and $R^6$ are as defined in the formula (II), and each of t and u is an integer of 1 to 4 provided that t+u equals 3 or 5.

Specific examples of the compound of the formula (II) (including the formulae (II)-1, (II)-2 and (II)-3)) are as follows.

When $M^2$ is tin (Sn):
LiSn(OMe)$_3$, LiSn(OEt)$_5$, LiSn(OBu)$_3$, LiSn(O-n-C$_{10}$H$_{21}$)$_5$, LiSn(OPh)$_3$, LiSn(OPh)$_5$, LiSnBu$_2$OMe, LiSnBu$_2$(OPr)$_3$, LiSnPh.(OMe)$_2$, LiSnEt$_2$(OPh)$_3$, NaSn(OMe)$_3$, NaSn(OMe)$_2$(OEt), NaSn(OPr)$_3$, NaSn(O-n-C$_6$H$_{13}$)$_3$, NaSn(OMe)$_5$, NaSn(OEt)$_5$, NaSn(OBu)$_5$, NaSn(O-n-C$_{12}$H$_{25}$)$_5$, NaSn(OPh)$_3$, NaSnBu$_2$(OMe), NaSnPh$_2$(OEt), NaSn(Oph)$_5$, NaSnBu$_2$(OMe)$_3$, NaSnPh$_2$(OPr)$_3$, NaSnBu$_2$(O-β-naphthyl)$_3$, NaSnMe$_2$(O-β-naphthyl)$_3$, KSn(OMe)$_3$, KSn(OBu)$_3$, KSn(OPh)$_3$, KSn(OMe)$_5$, KSn(OC$_6$H$_{13}$)$_5$, KSn(OPh)$_5$, CsSn(OMe)$_3$, CsSn(OBu)$_3$, RbSn(OMe)$_3$, RbSnBu$_2$(OMe), CsSn(OEt)$_5$, CsSn(O-cyclohexyl)$_5$, RbSn(OEt)$_5$, and RbSnBu$_2$(OPh)$_3$.

When $M^2$ is germanium (Ge):
NaGe(OMe)$_5$, NaGe(OEt)$_5$, NaGe(OPr)$_5$, NaGe(OBu)$_5$, NaGe(OPh)$_5$, LiGe(OMe)$_5$, LiGe(OBu)$_5$, and LiGe(OPh)$_5$.

When $M^2$ is lead (Pb):
LiPb(OMe)$_5$, LiPb(OBu)$_5$, LiPb(OPh)$_5$, NaPb(OMe)$_5$, NaPb(OEt)$_5$, NaPb(OPr)$_5$, NaPb(OBu)$_5$, and NaPb(OPh)$_5$.

The alkali metal salt of ate-complex can be prepared according to any one of the following reaction schemes (1) and (2):

$$M^2 X^1_p (OR^6)_{q-1} + M^1 OR^6 \rightarrow M^1 M^2 X^1_p (OR^6)_q \qquad (1)$$

$$M^2 X^1_{p-1} (OR^6)_q + M^1 X^1 \rightarrow M^1 M^2 X^1_p (OR^6)_q \qquad (2)$$

In the above reaction schemes (1) and (2), $M^1$, $M^2$, $X^1$, $R^6$, p and q are as defined in the formula (II).

In the process of the present invention, naturally, the alkali metal salt of ate-complex can be directly added to the polycondensation reaction system. Furthermore, when the alkali metal salt of ate-complex is prepared according to the above reaction scheme (1), the compound of $M^2X^1_p(OR^6)_{q-1}$ such as $Sn(OPh)_4$ and the compound of $M^1OR^6$ such as NaOPh may be separately added to the polycondensation reaction system to form an alkali metal salt of ate-complex in situ.

When the alkali metal salt of ate-complex is prepared according to one of the above reaction schemes (1) and (2), preferably, compounds as starting aw materials are used in equimolar amounts, or a compound containing a metal element $M^2$ of the group 14 of the periodic table is used in an excess amount slightly greater, for example, greater by 0.1 mol or less, than the amount of the other compound containing an alkali metal.

The (b) alkali metal salt of oxoacid of metal element of the group 14 of the periodic table preferably includes an alkali metal salt of silicic acid, an alkali metal salt of stannous acid, an alkali metal salt of stannic acid, an alkali metal salt of germanous acid, an alkali metal salt of germanic acid, an alkali metal salt of plumbous acid and an alkali metal salt of plumbic acid.

The alkali metal salt of silicic acid is, for example, an acidic or normal alkali metal salt of monosilicic acid or its condensate, and it includes monosodium orthosilicate, disodium orthosilicate, trisodium orthosilicate, tetrasodium orthosilicate, monosodium disilicate, disodium disilicate, trisodium trisilicate and monolithium orthosilicate.

The alkali metal salt of stannous acid is, for example, an acidic or normal alkali metal salt of monostannous acid, and it includes stannous acid monosodium salt and stannous acid monolithium salt.

The alkali metal salt of stannic acid is, for example, an acidic or normal alkali metal salt of monostannic acid or its condensate, and it includes monostannic acid disodium salt ($Na_2S_nO_3 \cdot xH_2O$, x=0- 5), monostannic acid tetrasodium salt ($Na_4SnO_4$), η-stannic acid monosodium salt ($Na_2O \cdot 5SnO_2 \cdot 8H_2O$), parastannic acid disodium salt ($Na_2Sn_5O_{11} \cdot 2H_2O$) and mesodistannic acid disodium salt ($Na_2SnO_5$).

The alkali metal salt of germanous acid is, for example, an acidic or normal alkali metal salt of monogermanous acid or its condensate, and it includes germanous acid monosodium salt ($NaHGeO_2$).

The alkali metal salt of germanic acid is, for example, an acidic or normal alkali metal salt of monogermanic acid or its condensate, and it includes orthogermanic acid monolithium salt ($LiH_3GeO_4$), orthogermanic acid disodium salt, orthogermanic acid tetrasodium salt, digermanic acid disodium salt ($Na_2Ge_2O_5$), tetragermanic acid disodium salt ($Na_2Ge_4O_9$), pentagermanic acid disodium salt ($Na_2Ge_5O_{11}$), methagermanic acid dilithium salt ($Li_2GeO_3$), methadigermanic acid monosodium salt ($NaH_3Ge_2O_6$), methadigermanic acid tetrasodium salt ($Na_4Ge_2O_6$) and pergermanic acid disodium salt ($Na_2Ge_2O_7$).

The alkali metal salt of plumbous acid is, for example, an acidic or normal alkali metal salt of monoplumbous acid, and it includes $NaHPbO_2$ and $KHPbO_2$.

The alkali metal salt of plumbic acid is, for example, an acidic or normal alkali metal salt of monoplumbic acid, and it includes $Na_2PbO_3$, $Na_2Pb_2O_5$, $Na_2Pb_4O_9$ and $Na_2Pb_5O_{11}$.

The (b) alkali metal salt of oxoacid of a metal element of the group 14 of the periodic table can be prepared, for example, by reacting an oxoacid or oxide of a metal element of the group 14 of the periodic table with a corresponding alkali metal compound.

The oxoacid of the metal element of the group 14 of the periodic table includes silicic acid, stannous acid, stannic acid, germanic acid, plumbous acid and plumbic acid.

Specific examples of these oxoacids will be apparent from the above specific examples of the oxoacid.

Further, the oxide of the metal element of the group 14 of the periodic table includes silicon monoxide, silicon dioxide, tin monoxide, tin dioxide, germanium monoxide, germanium dioxide, lead monoxide, lead dioxide and condensates of these.

The above alkali metal compound preferably includes hydroxides, alkoxides, phenoxides, carbonates and carboxylates of alkali metals.

In the process of the present invention, naturally, the alkali metal salt of oxoacid of the metal element of the periodic table can be directly added to the polycondensation reaction system. Further, when the alkali metal salt of oxoacid is prepared according to the above preparation reaction scheme, the oxoacid or oxide and the alkali metal compound may be separately added to the polycondensation reaction system to form an alkali metal salt of oxoacid of the metal element of the group 14 of the periodic table in situ.

When the alkali metal salt of the oxoacid is prepared according to the above preparation reaction scheme, it is preferred to use the oxoacid or oxide in a molar amount greater than the molar amount of the alkali metal compound. When it is prepared in situ, and when the oxoacid or oxide and the alkali metal compound are used such that the amount of the metal element of the group 14 of the periodic table in the oxoacid or oxide per mole of the alkali metal element of the alkali metal compound is 50 moles or less, preferably 0.1 to 30 moles, an intended alkali metal salt of oxoacid of the metal element of the group 14 of the periodic table is formed in the polycondensation reaction system, and further, there is also formed a state in which an auxiliary catalyst to be described later is present in a desirable amount in the polycondensation reaction system.

The above polycondensation catalyst is preferably used in such an amount that the content of the alkali metal element in the polycondensation catalyst per mole of the aromatic dihydroxy compound is $1 \times 10^{-7}$ to $5 \times 10^{-5}$ equivalent. The amount thereof is more preferably such an amount that the above content of the alkali metal element based on the same standard is $5 \times 10^{-7}$ to $1 \times 10^{-5}$ equivalent.

For the polycondensation reaction in the present invention, at least one auxiliary catalyst selected from the group consisting of oxoacids of metal elements of the group 14 of the periodic table and oxides of the same metal elements may be co-present as required in addition to the above polycondensation catalyst.

The oxoacids of metal elements of the group 14 of the periodic table include silicic acid, stannous acid, stannic acid, germanic acid, plumbous acid and plumbic acid.

The oxides of metal elements of the group 14 of the periodic table include silicon monoxide, silicon dioxide, stannous monoxide, stannic dioxide, germanium monoxide, germanium dioxide, plumbous monoxide, plumbic dioxide and condensates of these.

The amount of the auxiliary catalyst is preferably such an amount that the content of the metal element of the group 14 of the periodic table in the auxiliary catalyst per mole of the alkali metal element of the polycondensation catalyst is 50 atoms or less. When the auxiliary catalyst is used in such an amount that the content of the above metal element exceeds 50 moles, undesirably, the polycondensation rate decreases.

The amount of the auxiliary catalyst is more preferably such an amount that the content of the metal element of the group 14 of the periodic table in the auxiliary catalyst per mole of the alkali metal element of the polycondensation catalyst is 0.1 to 30 moles.

According to studies of the present inventor, it has been also revealed that, when a nitrogen-containing basic compound is further co-present in combination with the above polycondensation catalyst used in the present invention and the above auxiliary catalyst, unexpectedly, the polycondensation catalyst is improved in activity and a side reaction is suppressed.

In the above case, the aforesaid nitrogen-containing basic compound works as a cocatalyst with the polycondensation catalyst.

The above nitrogen-containing basic compound preferably has, for example, the formula (III),

$$R^7R^8R^9R^{10}NX^2 \qquad (III)$$

wherein each of $R^7$, $R^8$, $R^9$ and $R^{10}$ is independently an alkyl group having 1 to 20 carbon atoms or a cycloalkyl, cycloalkylalkyl, aryl or aralkyl group having 6 to 20 carbon atoms, and $X^2$ is $OR^{11}$, —$OCOR^{12}$, $B(R^{13})_4$ or F in which $R^{11}$ is a hydrogen atom, an alkyl group having 1 to 20 carbon atoms or a cycloalkyl, cycloalkylalkyl, aryl or aralkyl group having 6 to 20 carbon atoms, $R^{12}$ is a hydrogen atom, an alkyl group having 1 to 20 carbon atoms or a cycloalkyl, cycloalkylalkyl, aryl or aralkyl group having 6 to 20 carbon atoms and $R^{13}$ is a hydrogen atom or an aryl group having 6 to 20 carbon atoms.

In the above formula (III), each of $R^7$, $R^8$, $R^9$ and $R^{10}$ is independently an alkyl group having 1 to 20 carbon atoms or a cycloalkyl, cycloalkylalkyl, aryl or aralkyl group having 6 to 20 carbon atoms.

The alkyl group having 1 to 20 carbon atoms may be linear or branched, and specific examples thereof includes those specified with regard to the formula (II).

Specific examples of the cycloalkyl group having 6 to 12 carbon atoms include those specified with regard to the formula (II).

The cycloalkylalkyl group having 6 to 20 carbon atoms preferably includes those formed of a cycloalkyl having 5 to 12 carbon atoms and a linear or branched alkyl having 1 to 15 carbon atoms. Specific examples of the cycloalkylalkyl group includes cyclopentylmethyl, cyclohexylmethyl and 3,4-dimethylcyclohexylmethyl.

Specific examples of the aryl group having 6 to 20 carbon atoms include those specified with regard to the formula (II).

The aralkyl group having 6 to 20 carbon atoms preferably includes those formed of an aryl having 6 to 12 carbon atoms and a linear or branched alkyl group having 1 to 14 carbon atoms. Specific examples of the aralkyl group include benzyl, phenethyl and methylbenzyl.

In the formula (III), $X^2$ is $OR^{11}$, —$OCOR^{12}$, $B(R^{13})_4$ or F.

When $X^2$ is —$OR^{11}$, the formula (III) can be represented by the following formula (III)-1,

$$R^7R^8R^9R^{10}NOR^{11} \qquad (III)-1$$

wherein $R^7$, $R^8$, $R^9$, $R^{10}$ and $R^{11}$ are as defined in the formula (III).

Similarly, when $X^2$ is —$OCOR^{12}$, the formula (III) can be represented by the following formula (III)-2,

$$R^7R^8R^9R^{10}NOCOR^{12} \qquad (III)-2$$

wherein $R^7$, $R^8$, $R^9$, $R^{10}$ and $R^{12}$ are as defined in the formula (III).

Further, when $X^2$ is —$B(R^{13})_4$, the formula (III) can be represented by the following formula (III)-3,

$$R^7R^8R^9R^{10}NB(R^{13})_4 \qquad (III)-3$$

wherein $R^7$, $R^8$, $R^9$, $R^{10}$ and $R^{13}$ are as defined in the formula (III).

Further, when $X^2$ is F, the formula (III) can be represented by the following formula (III)-4,

$$R^7R^8R^9R^{10}NF \qquad (III)-4$$

wherein $R^7$, $R^8$, $R^9$ and $R^{10}$ are as defined in the formula (III).

In the above formula (III) (including the formulae (III)-1 to (III)-4), $R^{11}$ is a hydrogen atom, an alkyl having 1 to 20 carbon atoms, a cycloalkyl, cycloalkylalkyl, aryl or aralkyl group having 6 to 20 carbon atoms. $R^{12}$ has the same meaning as that of $R^{11}$. $R^{13}$ is a hydrogen atom or an aryl group having 6 to 20 carbon atoms. Specific examples of each group in the above definitions of $R^{11}$, $R^{12}$ and $R^{13}$ include those specified with regard to the formula (II).

The compound of the formula (III)-1 includes tetramethylammonium hydroxide (TMAH), ethyltrimethylammonium hydroxide, diethyldimethylammonium hydroxide, tetraethylammonium hydroxide, propyltriethylammonium hydroxide, butyltrimethylammonium hydroxide, dibutyldiethylammonium hydroxide, propyltributylammonium hydroxide, tetrabutylammonium hydroxide, ethyldimethylpentylammonium hydroxide, hexyltrimethylammonium hydroxide, hexyltriethylammonium hydroxide, hexyltributylammonium hydroxide, dihexyldimethylammonium hydroxide, nonyltripropylammonium hydroxide, diethylnonylpentylammonium hydroxide, decyltrimethylammonium hydroxide, tetrakis(decyl)ammonium hydroxide, tetradecyltrimethylammonium hydroxide, dimethylethyltetradecylammonium hydroxide, butyldiethyltetradecylammonium hydroxide, bis(tetradecyl)dimethylammonium hydroxide, bis(tetradecyl)ethylnonylammonium hydroxide, methyltris(tetradecyl)ammonium hydroxide, propyl(tetradecyl)ammonium hydroxide, nonyltris(tetradecyl)ammonium hydroxide, tetrakis(tetradecyl)ammonium hydroxide, hexadecyltrimethylammonium hydroxide, hexadecyltripropylammonium hydroxide, bis(hexadecyl)diethylammonium hydroxide, hexadecyltributylammonium hydroxide, hexadecyldimethylhexylammonium hydroxide, bis(hexadecyl)dimethylammonium hydroxide, tetrakis(hexadecyl)ammonium hydroxide; cyclohexyltrimethylammonium hydroxide, cyclopentyltributylammonium hydroxide, bis(cyclohexyl)ethylmethylammonium hydroxide, methyltris(cyclopentyl)ammonium hydroxide, tetrakis(cyclohexyl)ammonium hydroxide; phenyltrimethylammonium hydroxide, dimethylethylphenylammonium hydroxide, decylmethylnonylphenylammonium hydroxide, benzyltrimethylammonium hydroxide, benzyldimethylpropylammonium hydroxide, p-tolyltriethylammonium hydroxide, m-xylyltripropylammonium hydroxide, dimethyldiphenylammonium hydroxide, dimethylnonylphenylammonium hydroxide, 1-naphthyltrimethylammonium hydroxide, p-biphenyltriethylammonium hydroxide, 2-naphthyltripropylammonium hydroxide, cyclohexyldimethylphenylammonium hydroxide, 2-diethylnaphthylphenylammonium hydroxide; tetramethylammonium methoxide, tetramethylammonium ethoxide, tetramethylammonium n-propoxide, tetramethylammonium i-propoxide, tetramethylammonium n-butoxide, tetramethylammonium phenoxide, tetraethylammonium methoxide, tetraethylammonium ethoxide, ethyltrimethylammonium methoxide, ethyltrimethylammonium ethoxide, tetra-n-propylammonium methoxide, tetra-n-propylammonium ethoxide, tetrabutylammonium methoxide, tetrabutylammonium ethoxide, tetrabutylammonium i-propoxide, tri-n-butylethylammonium methoxide, tetrahexylammonium ethoxide, tetrahexylammonium i-propoxide, benzyltrimethylammonium methoxide, benzyltrimethylammonium ethoxide and benzyltriethylammonium methoxide.

Of the above compounds, compounds of $R^7(CH_3)_3NOH$ have high catalytic activity and are therefore preferred.

The compound of the formula (III)-2 includes tetramethylammonium acetate, tetramethylammonium hexanecarboxylate, tetramethylammonium nonanecarboxylate, tetramethylammonium hexadecanecarboxylate, tetramethylammonium cyclohexanecareboxylate, tetramethylammonium benzenecarboxylate, tetramethylammonium 2-naphthalenecarboxylate, ethyltrimethylammonium ethanecarboxylate, diethyldimethylammonium butanecarboxylate, tetraethylammonium octanecarboxylate, propyltriethylammonium tetradecanecarboxylate, dibutyldiethylammonium 1-naphthalenecarboxylate, tributylpropylammonium cyclopentanecarboxylate, tetrabutylammonium acetate, tetrabutylammonium benzenecarboxylate, pentyldimethylethylammonium butanecarboxylate, hexyltrimethylammonium oleate, hexyltrimethylammonium hexadecanecarboxylate, hexyltriethylammonium cyclohexanecarboxylate, hexyltributylammonium ethanecarboxylate, dihexyldimethylammonium hexanecarboxylate, bis(nonyltripropylammonium)succinate, bis(diethylnonylpentylammonium)adipate, bis(decyltrimethylammonium)terephthalate, tetrakis(decyl)ammonium cyclohexanecarboxylate, tetradecyltrimethylammonium tetradecanecarboxylate, dimethylethyltetradecylammonium p-dodecylbenzenecarboxylate, butyldiethyltetradecylammonium acetate, bis(tetradecyl)dimethylammonium pentanecarboxylate, bis(tetradecyl)ethylnonylammonium decanecarboxylate, tris(tetradecyl)methylammonium octadecanecarboxylate, tetrakis(tetradecyl)ammonium acetate, tetrakis(tetradecyl)ammonium formate, hexadecyltrimethylammonium cyclohexanecarboxylate, hexadecyltrimethylammonium 1-pyridinecarboxylate, hexadecyltripropylammonium 2-pyridinecarboxylate, bis(hexadecyl)diethylammonium 4-chlorobenzenecarboxylate, hexadecyltributylammonium 2,4-dibutylbenzenecarboxylate, dimethylhexadecylhexylammonium 6-methyl-2-naphthalenecarboxylate, bis(hexadecyl)dimethylammonium quinolinecarboxylate, tetrakis(hexadecyl)ammonium, cyclohexyltrimethylammonium formate, cyclopentyltributylammonium butanecarboxylate, bis(cyclohexyl)ethylmethylammonium octanecarboxylate, methyltris(cyclopentyl)ammonium dodecanecarboxylate, tetrakis(cyclohexyl)ammonium cyclohexanecarboxylate, phenyltrimethylammonium formate, phenyltrimethylammonium acetate, phenyltrimethylammonium decanecarboxylate, phenyltrimethylammonium hexadecanecarboxylate, phenyltrimethylammonium benzenecarboxylate, phenyltrimethylammonium 1-pyridinecarboxylate, phenyldimethylethylammonium 2-naphthalenecarboxylate, decylmethylnonylphenylammonium benzenecarboxylate, benzyltrimethylammonium hexadecanecarboxylate, benzyldimethylpropylammonium octanecarboxylate, p-tolyltriethylammonium acetate, m-xylyltripropylammonium pentanecarboxylate, bis(diphenyldimethylammonium)fumarate, bis(dimethylnonylphenylammonium)oxalate, tris(1-naphthyltrimethylammonium)trimellitate, p-biphenyltriethylammonium acetate, 2-naphthyltripropylammonium cyclobutanecarboxylate and cyclohexyldimethylphenylammonium decanecarboxylate.

The above compound of the formula (III)-2 has high catalytic activity and high stability, and it is therefore easy to handle and desirable.

The compound of the formula (III)-3 includes tetramethylammonium borohydride, ethyltrimethylammonium borohydride, diethyldimethylammonium borohydride, tetraethylammonium borohydride, butyltrimethylammonium borohydride, butylethylmethylpropylammonium borohydride, dibutyldiethylammonium borohydride, tetrabutylammonium borohydride, hexyltrimethylammonium borohydride, hexyltriethylammonium borohydride, hexyltributylammonium borohydride, dihexyldimethylammonium borohydride, nonyltripropylammonium borohydride, diethylnonylpentylammonium borohydride, decyltrimethylammonium borohydride, tetrakis(decyl)ammonium borohydride, tetradecyltrimethylammonium borohydride, dimethylethyltetradecylammonium borohydride, butyldiethyltetradecylammonium borohydride, bis(tetradecyl)dimethylammonium borohydride, bis(tetradecyl)ethylnonylammonium borohydride, methyltris(tetradecyl)ammonium borohydride, propyltris(tetradecyl)ammonium borohydride, nonyltris(tetradecyl)ammonium borohydride, tetrakis(tetradecyl)ammonium borohydride, hexadecyltrimethylammonium borohydride, hexadecyltripropylammonium borohydride, bis(hexadecyl)diethylammonium borohydride, hexadecyltributylammonium borohydride, dimethylhexadecylhexylammonium borohydride, bis(hexadecyl)dimethylammonium borohydride, tetrakis(hexadecyl)ammonium borohydride, cyclohexyltrimethylammonium borohydride, cyclopentyltributylammonium borohydride, bis(cyclohexyl)methylethylammonium borohydride, methyltris(cyclopentyl)ammonium borohydride, tetrakis(cyclohexyl)ammonium borohydride, phenyltrimethylammonium borohydride, dimethylethylphenylammonium borohydride, nonylphenyldecylammonium borohydride, benzyltrimethylammonium borohydride, benzyldimethylpropylammonium borohydride, p-tolyltriethylammonium borohydride, tripropyl m-xylylammonium borohydride, dimethyldiphenylammonium borohydride, dimethylnonylphenylammonium borohydride, 1-naphthyltrimethylammonium borohydride, p-biphenyltriethylammonium borohydride, 2-naphthyltripropylammonium borohydride, cyclohexyldimethylphenylammonium borohydride, diethyl 2-naphthylphenylammonium borohydride tetramethylammonium tetraphenylborate, tetramethylammonium triphenylbenzylborate, tetraethylammonium tetraphenylborate, tetraethylammonium triphenylbenzylborate, triethylmethylammonium tetraphenylborate, diethyldimethylammonium tetraphenylborate, tetra(n-propyl)ammonium tetraphenylborate, tetra(n-butyl)ammonium tetraphenylborate, tetra(n-propyl)ammonium dibenzyldiphenylborate, tri(n-propyl)methylammonium tetraphenylborate, tri(n-butyl)ethylammonium tetraphenylborate, tetra(n-hexyl)ammonium tetraphenylborate, cyclohexyltrimethylammonium tetraphenylborate, cyclohexyltriethylammonium tetraphenylborate and phenyltrimethylammonium tetraphenylborate.

Of the above compounds, preferred are tetramethylammonium tetraphenylborate and tetraphenylammonium tetraphenylborate.

The compound of the formula (III)-4 includes tetramethylammonium fluoride, ethyltrimethylammonium fluoride, diethyldimethylammonium fluoride, tetraethylammonium fluoride, n-propyltriethylammonium fluoride, n-butyltrimethylammonium fluoride, tetra n-butylammonium fluoride, hexyltrimethylammonium fluoride, hexyltriethylammonium fluoride, decyltrimethylammonium fluoride, cyclohexyltrimethylammonium fluoride, cyclopentyltrimethylammonium fluoride, cyclohexyltributylammonium fluoride, bis(cyclohexyl)dimethylammonium fluoride, tetrakis(cyclohexyl)ammonium fluoride, phenyltrimethylammonium fluoride, phenyltriethylammonium fluoride, dimethylethylphenylammonium fluoride, benzyltrimethylammonium fluoride, m-xylyltrimethylammonium fluoride, 1-naphthyltrimethylammonium fluoride and 2-naphthyltrimethylammonium fluoride.

When a nitrogen-containing basic compound is used alone as a polycondensation catalyst in the absence of the above polycondensation catalyst containing a metal of the group 14 of the periodic table, generally, the activity of the polycondensation catalyst sharply decreases when the temperature for the polycondensation of a polycarbonate exceeds 200° C., particularly 250° C. In the catalyst system in the present invention, however, the presence of the nitrogen-containing basic compound remarkably improves the catalytic activity.

The above nitrogen-containing basic compound is preferably used in such an amount that the content of the ammonium nitrogen atom in the nitrogen-containing basic compound is $1\times10^{-5}$ to $1\times10^{-3}$ equivalent per mole of the aromatic dihydroxy compound.

The more preferred amount is such that the above content based on the same standard is $2\times10^{-5}$ to $7\times10^{-4}$ equivalent. The particularly preferred amount is such that the above content based on the same standard is $5\times10^{-5}$ to $5\times10^{-4}$ equivalent.

In the process of the present invention, the polycondensation catalyst, the co-catalyst and the auxiliary catalyst are added to the polycondensation reaction system together or separately preferably before the initiation of the polymerization.

The above catalyst, co-catalyst and auxiliary catalyst may be added directly or in the form of a solution or dispersion in an inert solvent. The solution or suspension desirably contains these catalyst, etc., as solid contents in an amount of preferably 30% by weight or less, more preferably 20% by weight or less.

The concentration of oxygen dissolved in the above solution or suspension is preferably 100 ppm or less, more preferably 50 ppm or less, further preferably 10 ppm or less. When the oxygen concentration exceeds the above limit, the polycarbonate is liable to be colored and a branching component is liable to be formed due to the dissolved oxygen.

In the present invention, preferably, a stabilizer is added at least once before the initiation of polymerization, during the polymerization or after the termination of the polymerization. The stabilizer is selected from a sulfur-containing acidic compound and/or a derivative formed of this acidic compound, a phenol-containing stabilizer, a thioether-containing stabilizer, a phosphorus-containing stabilizer, a hindered amine-containing stabilizer, an epoxy compound, a salicylic acid-containing ultraviolet light absorbent, and a benzotriazole-containing ultraviolet light absorbent.

The sulfur-containing acidic compound and/or the derivative formed of this acidic compound include, for example, sulfurous acid, sulfuric acid, a sulfinic acid compound, a sulfonic acid compound and derivatives of these. The sulfuric acid derivative includes diethyl sulfate, dipropyl sulfate, dibutyl sulfate, diethyl sulfite, sodium dodecylsulfate, sodium hexadecylsulfate, butyldimethyltridecylammonium butylsulfate, dimethylethylhexadecylammonium ethylsulfate and decyltrimethylammonium methylsulfate.

The sulfinic acid compounds includes, for example, toluenesulfinic acid and naphthalenesulfinic acid. The sulfonic acid compound and the derivative thereof include sulfonic acids such as benzenesulfonic acid, p-toluenesulfonic acid; sulfonic acid esters such as methyl benzenesulfonate, ethyl benzenesulfonate, butyl benzenesulfonate, octyl benzenesulfonate, phenyl benzenesulfonate, methyl p-toluenesulfonate, butyl p-toluenesulfonate, butyl p-toluenesulfonate, octyl p-toluenesulfonate and phenyl p-toluenesulfonate; and sulfonic acid ammonium salts such as ammonium p-toluenesulfonate, tetrabutylphosphonium p-toluenesulfonate and tetraphenylphosphonium dodecylbenzenesulfonate.

The above compounds may be used alone or in combination. Of the above compounds, preferred are a sulfur-containing acidic compound having a pKa value of 3 or less, a sulfonic acid compound which is a derivative formed of this acidic compound and a derivative thereof. Particularly preferred are benzenesulfonic acid, butyl benzenesulfonate, p-toluenesulfonic acid, ethyl p-toluenesulfonate, butyl p-toluenesulfonate, sodium dodecylsulfate, methyl trimethyl sulfate, hexadecylammonium tetrabutylphosphonium p-toluenesulfonate, and tetraphenylphosphonium dodecylbenzenesulfonate.

The phenol-containing stabilizer includes, for example, n-octadecyl-3-(4-hydroxy-3',5'-di-t-butylphenyl)propionate, tetrakis[methylene-3-(3',5'-di-t-butyl-4-hydroxyphenyl)propionate]methane, 1,1,3-tris(5-t-butylphenyl-4-hydroxy-2-methyl)butane, distearyl(5-t-butyl-4-hydroxy-3-methyl)benzylmaronate, and 2,6-di-t-butyl-4-hydroxymethylphenyl. These compounds may be used alone or in combination.

The thioether-containing stabilizer includes, for example, dilaurylthiodipropionate, distearylthiodipropionate, dimyristyl-3,3'-thiodipropionate, ditridecyl-3,3'-thiodipropionate and pentaerythritol-tetrakis-(β-lauryl-thiopropionate). These compounds may be used alone or in combination.

The phosphorus-containing stabilizer includes, for example, arylalkyl phosphites such as bis(2,4-di-t-butylphenyl)pentaerythrityl diphosphite, diphenyldecyl phosphite, phenylisooctyl phosphite and 2-ethylhexyldiphenyl phosphite; trialkyl phosphites such as trimethyl phosphite, triethyl phosphite, tributyl phosphite, trioctadecyl phosphite, distearylpentaerythrityl diphosphite, tris(2-chloroethyl)phosphite and tris(2,3-dichloropropyl)phosphite; tricycloalkyl phosphite such as tricyclohexyl phosphite; triaryl phosphites such as triphenyl phosphite, tricresyl phosphite, tris(ethylphenyl)phosphite, tris(2,4-di-t-butylphenyl)phosphite and tris(hydroxyphenyl)phosphite; trialkyl phosphates such as trimethyl phosphate, triethyl phosphate, tributyl phosphate, trioctadecyl phosphate, distearylpentaerythrityl phosphate and tris(2-chloroethyl)phosphate; tricycloalkyl phosphates such as tricyclohexyl phosphate; and triaryl phosphates such as triphenyl phosphate, tricresyl phosphate, tris(nonylphenyl)phosphate and 2-ethylphenyldiphenyl phosphate. These compounds may be used alone or in combination.

The hindered amine-containing stabilizer includes, for example, bis(2,2,6,6-tetramethyl-4-piperidyl)sebacate, 8-benzyl-7,7,9,9-tetramethyl-3-octyl-1,2,3-triazaspiro[4,5]undecan-2,4-dione, 4-benzoyloxy-2,2,6,6-tetramethylpiperidine and tetrakis(4-piperidyl-2,2,6,6-tetramethyl) 1,2,3,4-butanetetracarboxylate. These compounds may be used alone or in combination.

In the present invention, an epoxy compound may be used as a stabilizer. An epoxy compound having at least one epoxy group per molecule is preferred.

The above epoxy compound specifically includes, for example, epoxidized soybean oil, epoxidized linseed oil, phenylglycidyl ether, t-butylphenylglycidyl ether, 3,4-epoxycyclohexylmethyl- 3',4'-epoxycyclohexyl carboxylate, 3,4-epoxycyclohexylethylene oxide, cyclohexylmethyl-3,4-epoxycyclohexyl carboxylate, 3,4-epoxy-6 -methylcyclohexylmethyl-6'-methylcyclohexyl carboxylate, bisphenol-A diglycidyl ether, diglycidyl phthalate, diglycidyl hexahydrophthalate, bis-epoxydicyclopentadienyl ether, bis-epoxyethylene glycol, bis-epoxycycloheyxl adipate, butadiene diepoxide, tetraphenyl ethylene epoxide, thallate, epoxidized polybutadiene, 3,4-dimethyl-1,2-epoxycyclohexane, 3,5-dimethyl-1,2-epoxycyclohexane and 3-methyl-5-t-butyl-1, 2-epoxycyclohexane.

The salicylic acid-containing ultraviolet light absorbent includes, for example, phenyl salicylate and p-t-butylphenyl salicylate. The benzophenone-containing ultraviolet light absorbent includes 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenone trihydrate, 2-hydroxy-4-n-octyloxybenzophenone, 2,2',4,4'-tetrahydroxybenzophenone, 4-dodecyloxy-2-hydroxybenzophenone, bis(5-benzoyl-4-hydroxy-2-methoxyphenyl)methane and 2-hydroxy-4 -methoxybenzophenone-5-sulfonic acid.

The benzotriazole-containing ultraviolet light absorbent includes, for example, 2-(2'-hydroxy-5'-methyl-phenyl)benzotriazole, 2-(2' -hydroxy-3',5'-di-t-butyl-phenyl)benzotriazole, 2-(2' -hydroxy-3'-t-butyl-5'-methyl-phenyl)-5-chlorobenzotriazole, 2-(2'-hydroxy-3',5'-di-t-butyl-phenyl)-5-chlorobenzotriazole, 2-(2'-hydroxy-5'-octylphenyl)benzotriazole, 2-(2'-hydroxy-3',5'-di-t-amylphenyl)benzotriazole, 2-[2'-hydroxy- 3'-(3",4",5",6"-tetrahydrophthalimidemethyl)- 5'-methylphenyl]benzotriazole, and 2,2'-methylenebis[4-(1,1,3,3-tetramethylbutyl)-6-(2H-benzotriazol-2-yl)phenol].

The cyanoacrylate-containing ultraviolet light absorbent includes, for example, 2-ethylhexyl-2 -cyano-3,3-diphenyl acrylate and ethyl-2-cyano-3,3-diphenyl acrylate.

The amount of the above stabilizer per mole of the above aromatic dihydroxy compound is $10^{-8}$ to $10^{-1}$ mol, preferably $10^{-7}$ to $10^{-2}$ mol.

In the present invention, a phenol having preferably 10 to 40 carbon atoms, more preferably 15 to 40 carbon atoms, may be added to the polycondensation reaction system as an agent for blocking the terminals of the polycarbonate to be formed. The amount of the phenol based on the aromatic dihydroxy compound is preferably 0.05 to 10 mol %, more preferably 0.5 to 7 mol %, further preferably 1 to 5 mol %.

The phenol having 10 to 40 carbon atoms includes monohydric phenols such as o-n-butylphenol, p-cyclohexylphenol, o-phenylphenol, m-isobutylphenol, m-n-nonylphenol, p-t-butylphenol, o-n-pentylphenol, p-cumylphenol, p-n-pentylphenol, o-naphthylphenol, p-n-pentylphenol, m-n-hexylphenol, 2,6-di-t-butylphenol, 2,4-di-t-butylphenol, 3,5-di-t-butylphenol, 2,6-dicumylphenol, 3,5-dicumylphenol and monohydroxychroman derivatives such as 2,2,2-trimethyl-4-(hydroxyphenyl)chroman.

In the present invention, the aromatic dihydroxy compound and the diaryl carbonate can be reacted in a polycondensation reaction under the same conditions as conventionally known polycondensation reaction conditions.

Specifically, in the first stage, the aromatic dihydroxy compound and the diaryl carbonate are reacted under reduced pressure at a temperature between 80° and 250° C., preferably between 100° and 230° C., more preferably between 120° and 190° C., for 0.5 to 5 hours, preferably for 1 to 4 hours, more preferably for 1.5 to 3 hours. Then, the reaction temperature is increased while increasing the vacuum degree of the reaction system, and the aromatic dihydroxy compound and the diaryl carbonate are reacted. Finally, the aromatic dihydroxy compound and the diaryl carbonate are reacted in a polycondensation reaction under a reduced pressure of 5 mmHg or less, preferably 1 mmHg or less, at a temperature between 240° and 320° C.

The above polycondensation may be carried out by any one of a continuous method and a batch method. Further, the apparatus used for the above reaction may be any one of vessel, tube and column types.

The polycarbonate obtained by the above procedures generally has an intrinsic viscosity, measured in methylene chloride at 20° C., of preferably 0.1 to 1.0, more preferably 0.2 to 0.8.

In the present invention, further, a mold releasing agent, a colorant, an antistatic agent, a lubricant, an anti-fogging agent, natural oil, synthetic oil, wax, an organic filler and an inorganic filler may be added to the above-obtained polycarbonate unless the objects of the present invention are impaired.

According to the present invention, there can be produced a polycarbonate which has an excellent polymer color hue and has side reactions inhibited and which is almost free of insolubles and foreign matter formed by a branching reaction even when it has a high polymerization degree. Further, when the polycarbonate produced according to the present invention is molded, side reactions such as a branch-formation are prevented, and the burning in an apparatus, coloring (yellowing), insolubilization, the formation of undesirable particles and the decreasing of molecular weight are suppressed to low levels.

According to the present invention, further, a polycarbonate having the above high quality can be produced effectively with high productivity.

According to the present invention, the above polycarbonate having high quality can be continuously produced for a considerably long period of time with the same polymerization apparatus without washing the apparatus, so that the process of the present invention is highly advantageous for the industrial production of the polycarbonate.

The above advantages of the process of the present invention are basically accomplished by a combination of the above polycondensation catalyst used in the process of the present invention and found by the present inventors, with the auxiliary catalyst, and further, by the combination of the polycondensation catalyst and/or the auxiliary catalyst with the co-catalyst.

DESCRIPTION OF SPECIFIC EMBODIMENTS

According to the present invention, therefore, there is also provided a polycondensation catalyst for a polycarbonate, which comprises at least one alkali metal salt selected from the group consisting of alkali metal salts of ate-complexes of metal elements of the group 14 of the periodic table and alkali metal salts of oxoacids of said metal elements, the above metal elements of the group 14 of the periodic table being silicon, germanium, stannum (tin) and plumbum (lead); a catalyst comprising a combination of the above polycondensation catalyst with at least one auxiliary catalyst selected from oxoacids of metal elements of the group 14 of the periodic table and oxides of said metals; and a catalyst comprising a combination of either the above polycondensation catalyst or the above combination of the polycondensation catalyst with the auxiliary catalyst with a nitrogen-containing basic compound as a co-catalyst.

EXAMPLES

The present invention will be explained hereinafter with reference to Examples, in which "part" stands for "part by weight" unless otherwise specified.

Physical properties, etc., described in Examples were evaluated according to the following methods.

(i) Intrinsic viscosity [η]: Measured in methylene chloride at 20° C. with a Ubbelohde's viscometer.

(ii) Filterability and formation of foreign matter (undesirable particles): A polymer was treated in a test tube of SUS 316 under nitrogen current at 290° C. for 2.0 hours. The resultant polymer was pulverized, and 5 g of the pulverized polymer was added to 100 ml of methylene chloride and ultrasonically dissolved. The polymer solution was filtered through a 1-micron millipore filter under a pressure of 0.5 kg/cm$^2$.

The polymer was evaluated for filterability on the basis of three ratings: "Excellent"=Filtering completed for less than 15 minutes, "Slightly defective"=Filtering completed for 15 to 30 minutes, and "Defective"=The filtering took more than 30 minutes. Further, the polymer was evaluated for the formation of foreign matter in terms of the number of black foreign matter pieces on the basis of three ratings: "Small"= Less than 10 pieces, "Intermediate"= 10 to 20 pieces, and "Many"=more than 20 pieces.

(iii) Polymer color tone:

L value and b value: A 3 mm thick injection-molded plate was formed by injection molding at a cylinder temperature of 300° C. at an injection pressure of 100 kg/cm$^2$ and a mold temperature of 90° C., and measured for X, Y and Z values for an L value and b value with a color and color difference meter ND-1001DP supplied by Nippon Denshoku Kogyo K.K. by a transmission method.

(iv) Gel evaluation

10 Grams of a polymer was placed in a container of stainless steel, and heat-treated under conditions of 290° C./0.3–0.5 mmHg/20 hours. Then, the polymer was dissolved in 500 to 1,000 ml of methylene chloride, and insolubles were taken. The dry amount of the insolubles was expressed in terms of weight percent based on the sample weight measured before the sample had been dissolved.

(v) Polymerization activity

A time (t:hour) taken before the intrinsic viscosity [η] became 0.45 was measured. The productivity is expressed by way of 24 hours/t.

Examples 1–31 and 33

228 Parts of bisphenol-A (BPA), 225 parts of diphenyl carbonate and a catalyst shown in Table 1 in the amount shown in Table 1 were charged into a 100 liter reactor having a stirrer, a distillater and a pressure-reducing device, and the reactor was subjected to replacement of air with nitrogen. Then, the mixture was treated at 140° C. to form a solution, and the solution was stirred for 30 minutes. The temperature in the reactor was increased to 180° C., and the pressure in the reactor was gradually reduced. And, the mixture was allowed to react at 100 mmHg for 30 minutes, and formed phenol was distilled off.

Further, while the temperature in the reactor was increased to 200° C., the pressure in the reactor was gradually reduced. The reaction mixture was allowed to react at 50 mmHg for 30 minutes while phenol was distilled off, and the ester exchange reaction was completed.

Then, the reaction liquid was recharged into a second reactor, and was gradually temperature-increased and pressure-decreased to 220° C. and 30 mmHg, and the reaction liquid was allowed to react at the above temperature under the above reduced pressure for 30 minutes. Further, the reaction was continued by repeating the temperature increase and pressure decrease to 240° C. and 10 mmHg, 260° C. and 1 mmHg, and 270° C. and 1 mmHg or lower in the same manner as above.

The polymerization was further continued at 270° C. under a pressure of 1 mmHg with measuring a power required for stirring the reactant while a time taken for [η]=0.45 was measured with proper sampling, and the polycondensation was continued until [η]=0.5 was found, to give a polycarbonate.

Table 1 shows the physical properties of the so-obtained polycarbonates.

In each of Examples 10, 11, 12, 25 and 26, a compound of an element of the group 14 and an alkali metal compound were pre-mixed at room temperature to prepare a catalyst, and the catalyst was added to the reactor. In each of Examples 13, 14, 27 and 28, a compound of an element of the group 14 and an alkali metal compound were separately added to the reactor to form a catalyst in the reactor.

Example 32

228 Parts of bisphenol-0A, 181.9 parts of dipheyl carbonate, 95.4 parts of diphenyl isophthalate and a catalyst shown in Table 1 were charged into the same reactor as that used in Example 1, and the reactor was subjected to replacement of air with nitrogen. Then, the mixture was treated at 150° C. to form a solution. The solution was stirred for 30 minutes, and then the pressure in the reactor was gradually decreased to 100 mmHg. The solution was allowed to react under the above pressure for 30 minutes. Further, under the same pressure, the temperature in the reactor was gradually increased to 180° C., and under the above pressure at the above temperature, the reaction was continued for 1 hour. Further, while the pressure in the reactor was gradually decreased to 30 mmHg, the temperature in the reactor was gradually increased up to 200° C. Under the above pressure at the above temperature, phenol was distilled off over 1 hour, and then the ester exchange reaction was terminated.

The above-obtained reaction mixture was recharged into a neighboring polymerization vessel which was the same as the above reactor in type, and the polycondensation was continued under the same conditions as those in Example 1 until [η]=0.5 was found.

Table 1 shows the polymerization activity and the physical properties of the above-obtained polymer.

Comparative Examples 1–4

Polycarbonates were prepared in the same manner as in Example 1 except that the catalyst was replaced with a catalyst shown in Table 2. Table 2 shows the polymerization activity and the physical properties of the so-obtained polymer.

The polycarbonates produced according to the present invention were rapidly filtered since the content of insoluble foreign matter was small. On the other hand, the polycarbonates produced in Comparative Examples showed a large amount of gel-like foreign matter on a filter when filtered. According to the present invention, when injection-molded plates for the evaluation of color tone were formed and the molding was resumed after the molding was finished, the number of black foreign matter particles was maintained at a low level.

In the following Tables, TMAH stands for tetramethyl ammonium hydroxide, and the asterisks denote as follows:

(*1) Molar equivalent of alkali metal per mole of BPA (*2) Molar equivalent of element of group 14 per mole of BPA (*3) Molar equivalent of alkali metal per mole of BPA (*4) Molar equivalent of nitrogen-containing compound per mole of BPA

TABLE 1

| | Example | | |
|---|---|---|---|
| | 1 | 2 | 3 |
| Component from element of group 14 | | | |
| Kind | sodium metagermanate $<Na_2GeO_3>$ | acidic sodium dimetagermanate $<NaH_3Ge_2O_6>$ | sodium pentagermanate $<Na_2Ge_5O_{11}>$ |
| Amount (part)/(molar equivalent/1 mol BPA*1) | $4.2 \times 10^{-4}/$ $5 \times 10^{-6}$ | $1.3 \times 10^{-3}/$ $5 \times 10^{-6}$ | $1.5 \times 10^{-3}/$ $5 \times 10^{-6}$ |
| Kind | — | — | — |
| Amount (part)/(molar equivalent/1 mol BPA*2) | — | — | — |
| Alkali metal compound | | | |
| Kind | — | — | — |
| Amount (part)/(molar equivalent/1 mol BPA*3) | — | — | — |
| Nitrogen-containing basic compound | | | |
| Kind | — | — | — |
| Amount (part)/(molar equivalent/1 mol BPA*4) | — | — | — |
| Physical properties of polymer | | | |
| Polymer color tone | | | |
| L value | 67 | 68 | 68 |
| b value | 1.5 | 1.5 | 1.5 |
| Filterability | Excellent | Excellent | Excellent |
| Amount of black foreign matter | Small | Small | Small |
| Gel evaluation (wt. %) | 20 | 21 | 24 |
| Polymerization activity | | | |
| Polymerization time (hour) | 7 | 7 | 8 |
| Productivity (—) | 3 | 3 | 3 |

| | Example | | |
|---|---|---|---|
| | 4 | 5 | 6 |
| Catalyst | | | |
| Component from element of group 14 | | | |
| Kind | sodium metagermanate $<Na_2GeO_3>$ | trisodium orthogermanate $<(NaO)_3GeOH>$ | trisodium orthogermanate $<(NaO)_3GeOH>$ |
| Amount (part)/(molar equivalent/1 mol BPA*1) | $4.2 \times 10^{-4}/$ $5 \times 10^{-6}$ | $3.4 \times 10^{-4}/$ $5 \times 10^{-6}$ | $3.4 \times 10^{-4}/$ $5 \times 10^{-6}$ |
| Kind | — | — | germanium monoxide $<GeO>$ |
| Amount (part)/(molar equivalent/1 mol BPA*2) | — | — | $4.4 \times 10^{-3}/$ $5 \times 10^{-5}$ |
| Alkali metal compound | | | |
| Kind | — | — | — |
| Amount (part)/(molar equivalent/1 mol BPA*3) | — | — | — |

TABLE 1-continued

| Nitrogen-containing basic compound | | | |
|---|---|---|---|
| Kind | TMAH | TMAH | TMAH |
| Amount (part)/(molar equivalent/1 mol BPA*4) | $9.1 \times 10^{-3}/$ $1 \times 10^{-4}$ | $9.1 \times 10^{-3}/$ $1 \times 10^{-4}$ | $9.1 \times 10^{-3}/$ $1 \times 10^{-4}$ |
| Physical properties of polymer | | | |
| Polymer color tone | | | |
| L value | 68 | 68 | 68 |
| b value | 1.5 | 1.4 | 1.5 |
| Filterability | Excellent | Excellent | Excellent |
| Amount of black foreign matter | Small | Small | Small |
| Gel evaluation (wt. %) | 10 | 12 | 7 |
| Polymerization activity | | | |
| Polymerization time (hour) | 5.5 | 5 | 5 |
| Productivity (—) | 4 | 4 | 4 |

| | Example | | |
|---|---|---|---|
| | 7 | 8 | 9 |
| Component from element of group 14 | | | |
| Kind | sodium metagermanate $<Na_2GeO_3>$ | sodium digermanate $<Na_2Ge_2O_7>$ | sodium pentagermanate $<Na_2Ge_5O_{11}>$ |
| Amount (part)/(molar equivalent/1 mol BPA*1) | $7.6 \times 10^{-4}/$ $5 \times 10^{-6}$ | $7.6 \times 10^{-4}/$ $5 \times 10^{-6}$ | $1.5 \times 10^{-3}/$ $5 \times 10^{-5}$ |
| Kind | germanium dioxide $<GeO2>$ | germanium dioxide $<GeO2>$ | stannic dioxide $<SnO_2>$ |
| Amount (part)/(molar equivalent/1 mol BPA*2) | $1.0 \times 10^{-2}/$ $1 \times 10^{-4}$ | $1.0 \times 10^{-2}/$ $1 \times 10^{-4}$ | $4.5 \times 10^{-3}/$ $3 \times 10^{-5}$ |
| Alkali metal compound | | | |
| Kind | — | — | — |
| Amount (part)/(molar equivalent/1 mol BPA*3) | — | — | — |
| Nitrogen-containing basic compound | | | |
| Kind | TMAH | — | TMAH |
| Amount (part)/(molar equivalent/1 mol BPA*4) | $9.1 \times 10^{-3}/$ $1 \times 10^{-4}$ | | $9.1 \times 10^{-3}/$ $1 \times 10^{-4}$ |
| Physical properties of polymer | | | |
| Polymer color tone | | | |
| L value | 68 | 68 | 68 |
| b value | 1.4 | 1.4 | 1.4 |
| Filterability | Excellent | Excellent | Excellent |
| Amount of black foreign matter | Small | Small | Small |
| Gel evaluation (wt. %) | 9 | 8 | 7 |
| Polymerization activity | | | |
| Polymerization time (hour) | 5.5 | 5.5 | 6 |
| Productivity (—) | 4 | 4 | 4 |

| | Example | | |
|---|---|---|---|
| | 10 | 11 | 12 |
| Catalyst | | | |
| Component from element of group 14 | | | |
| Kind | — | — | — |
| Amount (part)/(molar equivalent/1 mol BPA*1) | — | — | — |
| Kind | germanium | germanium | germanium |

TABLE 1-continued

| | | | |
|---|---|---|---|
| | dioxide<br><GeO2> | dioxide<br><GeO2> | monoxide<br><GeO> |
| Amount (part)/(molar equivalent/1 mol BPA*2) | $1/0 \times 10^{-2}/$<br>$1 \times 10^{-4}$ | $1.0 \times 10^{-3}/$<br>$1 \times 10^{-5}$ | $4.4 \times 10^{-3}/$<br>$5 \times 10^{-5}$ |
| Alkali metal compound | | | |
| Kind | sodium<br>hydroxide<br><NAOH> | sodium<br>stearate<br>< > | sodium<br>hydroxide<br><NAOH> |
| Amount (part)/(molar equivalent/1 mol BPA*3) | $2 \times 10^{-4}/$<br>$5 \times 10^{-6}$ | $1.8 \times 10^{-3}/$<br>$6 \times 10^{-6}$ | $2 \times 10^{-4}/$<br>$5 \times 10^{-6}$ |
| Nitrogen-containing basic compound | | | |
| Kind | — | — | — |
| Amount (part)/(molar equivalent/1 mol BPA*4) | — | — | — |
| Physical properties of polymer | | | |
| Polymer color tone | | | |
| L value | 68 | 68 | 68 |
| b value | 1.4 | 1.5 | 1.5 |
| Filterability | Excellent | Excellent | Excellent |
| Amount of black foreign matter | Small | Small | Small |
| Gel evaluation (wt. %) | 18 | 13 | 15 |
| Polymerization activity | | | |
| Polymerization time (hour) | 7 | 7 | 7 |
| Productivity (—) | 3 | 3 | 3 |

| | Example | | |
|---|---|---|---|
| | 13 | 14 | 15 |
| Component from element of group 14 | | | |
| Kind | — | — | sodium penta-methoxygerma-nate<br><NaGe(OMe)5> |
| Amount (part)/(molar equivalent/1 mol BPA*1) | — | — | $2.5 \times 10^{-4}/$<br>$1 \times 10^{-6}$ |
| Kind | germanium<br>monoxide<br><GeO> | germanium<br>dioxide<br><GeO2> | — |
| Amount (part)/(molar equivalent/1 mol BPA*2) | $4.4 \times 10^{-3}/$<br>$5 \times 10^{-5}$ | $1 \times 10^{-2}/$<br>$1 \times 10^{-4}$ | — |
| Alkali metal compound | | | |
| Kind | sodium<br>hydroxide<br><NaOH> | sodium<br>hydroxide<br><NaOH> | — |
| Amount (part)/(molar equivalent/1 mol BPA*3) | $2 \times 10^{-4}/$<br>$5 \times 10^{-6}$ | $2 \times 10^{-4}/$<br>$5 \times 10^{-6}$ | — |
| Nitrogen-containing basic compound | | | |
| Kind | decyltrimethyl<br>ammonium<br>hydroxide<br><C10H21NMe3OH> | TMAH | benzyltrimethyl<br>ammonium<br>hydroxide<br><PhCH2NMe3OH> |
| Amount (part)/(molar equivalent/1 mol BPA*4) | $1.1 \times 10^{-2}/$<br>$5 \times 10^{-5}$ | $9.1 \times 10^{-3}/$<br>$1 \times 10^{-4}$ | $8.4 \times 10^{-3}/$<br>$5 \times 10^{-5}$ |
| Physical properties of polymer | | | |
| Polymer color tone | | | |
| L value | 68 | 67 | 68 |
| b value | 1.5 | 1.5 | 1.4 |
| Filterability | Excellent | Excellent | Excellent |
| Amount of black foreign | Small | Small | Small |
| Gel evaluation (wt. %) | 8 | 7 | 12 |

TABLE 1-continued

| Polymerization activity | | | |
|---|---|---|---|
| Polymerization time (hour) | 5 | 5 | 5 |
| Productivity (−) | 4 | 4 | 4 |

| | Example | | |
|---|---|---|---|
| | 16 | 17 | 18 |
| Catalyst | | | |
| Component from element of group 14 | | | |
| Kind | sodium pentamethoxy-germanate <NaGe(OMe)$_5$> | sodium hydrogen-stannite <NaHSnO$_2$> | sodium α-stannate trihydrate <Na$_2$SnO$_3$·3H$_2$O> |
| Amount (part)/(molar equivalent/1 mol BPA*1) | 2.5 × 10$^{-4}$/ 1 × 10$^{-6}$ | 8.7 × 10$^{-4}$/ 5 × 10$^{-6}$ | 6.7 × 10$^{-4}$/ 5 × 10$^{-6}$ |
| Kind | germanium dioxide <GeO$_2$> | — | — |
| Amount (part)/(molar equivalent/1 mol BPA*2) | 1 × 10$^{-3}$/ 1 × 10$^{-5}$ | — | — |
| Alkali metal compound | | | |
| Kind | — | — | — |
| Amount (part)/(molar equivalent/1 mol BPA*3) | — | — | — |
| Nitrogen-containing basic compound | | | |
| Kind | hexadecyltri-methylammonium hydroxide <C$_{16}$H$_{33}$NMe$_3$OH> | — | — |
| Amount (part)/(molar equivalent/1 mol BPA*4) | 9 × 10$^{-3}$/ 3 × 10$^{-5}$ | — | — |
| Physical properties of polymer | | | |
| Polymer color tone | | | |
| L value | 68 | 67 | 66 |
| b value | 1.4 | 1.6 | 1.6 |
| Filterability | Excellent | Excellent | Excellent |
| Amount of black foreign | Small | Small | Small |
| Gel evaluation (wt. %) | 11 | 27 | 2 |
| Polymerization activity | | | |
| Polymerization time (hour) | 5 | 8 | 8 |
| Productivity (−) | 4 | 3 | 3 |

| | Example | | |
|---|---|---|---|
| | 19 | 20 | 21 |
| Component from element of group 14 | | | |
| Kind | sodium hydrogen stannite <NaHSnO$_2$> | sodium α-stannate <Na$_2$SnO$_3$> | sodium para-stannate <Na$_2$Sn$_5$O$_{11}$·2H$_2$O> |
| Amount (part)/(molar equivalent/1 mol BPA*1) | 8.7 × 10$^{-4}$/ 5 × 10$^{-6}$ | 3.2 × 10$^{-4}$/ 3 × 10$^{-6}$ | 1.3 × 10$^{-3}$/ 3 × 10$^{-6}$ |
| Kind | — | — | — |
| Amount (part)/(molar equivalent/1 mol BPA*2) | — | — | — |
| Alkali metal compound | | | |
| Kind | — | — | — |
| Amount (part)/(molar equivalent/1 mol BPA*3) | — | — | — |
| Nitrogen-containing basic compound | | | |
| Kind | TMAH | TMAH | benzyltrimethyl |

TABLE 1-continued

| | | | ammonium hydroxide PhCH$_2$NMe$_3$OH |
|---|---|---|---|
| Amount (part)/(molar equivalent/1 mol BPA*4) | 9 × 10$^{-3}$/ 1 × 10$^{-4}$ | 6.4 × 10$^{-3}$/ 7 × 10$^{-5}$ | 8.4 × 10$^{-3}$/ 5 × 10$^{-5}$ |
| Physical properties of polymer | | | |
| Polymer color tone | | | |
| L value | 66 | 66 | 66 |
| b value | 1.6 | 1.6 | 1.6 |
| Filterability | Excellent | Excellent | Excellent |
| Amount of black foreign matter | Small | Small | Small |
| Gel evaluation (wt. %) | 22 | 20 | 21 |
| Polymerization activity | | | |
| Polymerization time (hour) | 5.5 | 5.5 | 5.5 |
| Productivity (—) | 4 | 4 | 4 |

| | Example | | |
|---|---|---|---|
| | 22 | 23 | 24 |
| Component from element of group 14 | | | |
| Kind | sodium hydrogen stannite <NaHSnO$_2$> | sodium para-stannate <Na$_2$Sn$_5$O$_{11}$·2H$_2$O> | sodium meta-stannate <Na$_2$Sn$_5$O$_{11}$·4H$_2$O> |
| Amount (part)/(molar equivalent/1 mol BPA*1) | 8.7 × 10$^{-4}$/ 5 × 10$^{-6}$ | 1.3 × 10$^{-3}$/ 3 × 10$^{-6}$ | 1.3 × 10$^{-3}$/ 3 × 10$^{-6}$ |
| Kind | stannic dioxide <SnO$_2$> | germanium monoxide <GeO> | germanium dioxide <GeO$_2$> |
| Amount (part)/(molar equivalent/1 mol BPA*2) | 1.5 × 10$^{-2}$/ 1 × 10$^{-4}$ | 3.5 × 10$^{-3}$/ 4 × 10$^{-5}$ | 1 × 10$^{-2}$/ 1 × 10$^{-4}$ |
| Alkali metal compound | | | |
| Kind | — | — | — |
| Amount (part)/(molar equivalent/1 mol BPA*3) | — | — | — |
| Nitrogen-containing basic compound | | | |
| Kind | phenyltrimethyl ammonium hydroxide PhNMe$_3$OH | benzyltrimethyl ammonium hydroxide PhCH$_2$NMe$_3$OH | tetraethyl ammonium acetate |
| Amount (part)/(molar equivalent/1 mol BPA*4) | 1.5 × 10$^{-2}$/ 1 × 10$^{-4}$ | 8.4 × 10$^{-3}$/ 5 × 10$^{-5}$ | 1.9 × 10$^{-2}$/ 1 × 10$^{-4}$ |
| Physical properties of polymer | | | |
| Polymer color tone | | | |
| L value | 67 | 67 | 67 |
| b value | 1.6 | 1.5 | 1.5 |
| Filterability | Excellent | Excellent | Excellent |
| Amount of black foreign | Small | Small | Small |
| Gel evaluation (wt. %) | 13 | 10 | 10 |
| Polymerization activity | | | |
| Polymerization time (hour) | 5 | 5.5 | 5.5 |
| Productivity (—) | 4 | 4 | 4 |

| | Example | | |
|---|---|---|---|
| | 25 | 26 | 27 |
| Catalyst | | | |
| Component from element of group 14 | | | |
| Kind | — | — | — |
| Amount (part)/(molar | — | — | — |

TABLE 1-continued

| | Example | | |
|---|---|---|---|
| equivalent/1 mol BPA*1) Kind | stannous oxide <SnO> | stannic dioxide <SnO$_2$> | stannous oxide <SnO> |
| Amount (part)/(molar equivalent/1 mol BPA*2) | 6.7 × 10$^{-3}$/ 5 × 10$^{-5}$ | 3.0 × 10$^{-3}$/ 2 × 10$^{-5}$ | 6.7 × 10$^{-3}$/ 5 × 10$^{-5}$ |
| Alkali metal compound | | | |
| Kind | sodium hydroxide <NAOH> | sodium benzoate <PhCO$_2$Na> | sodium hydroxide <NAOH> |
| Amount (part)/(molar equivalent/1 mol BPA*3) | 2 × 10$^{-2}$/ 5 × 10$^{-6}$ | 4.3 × 10$^{-4}$/ 3 × 10$^{-6}$ | 2 × 10$^{-2}$/ 5 × 10$^{-6}$ |
| Nitrogen-containing basic compound | | | |
| Kind | — | — | TMAH |
| Amount (part)/(molar equivalent/1 mol BPA*4) | | | 9.1 × 10$^{-3}$/ 1 × 10$^{-4}$ |
| Physical properties of polymer | | | |
| Polymer color tone | | | |
| L value | 67 | 67 | 67 |
| b value | 1.6 | 1.5 | 1.5 |
| Filterability | Excellent | Excellent | Excellent |
| Amount of black foreign matter | Small | Small | Small |
| Gel evaluation (wt. %) | 30 | 27 | 12 |
| Polymerization activity | | | |
| Polymerization time (hour) | 7 | 7 | 5.5 |
| Productivity (—) | 3 | 3 | 4 |

| | Example | | |
|---|---|---|---|
| | 28 | 29 | 30 |
| Catalyst | | | |
| Component from element of group 14 | | | |
| Kind | — | sodium trimethoxy stannate <NaSn(OMe)$_3$> | sodium pentaethoxy stannate <NaSn(OEt)$_5$> |
| Amount (part)/(molar equivalent/1 mol BPA*1) | — | 2.4 × 10$^{-3}$/ 1 × 10$^{-5}$ | 3.7 × 10$^{-3}$/ 1 × 10$^{-5}$ |
| Kind | stannic dioxide <SnO2> | — | — |
| Amount (part)/(molar equivalent/1 mol BPA*2) | 3.0 × 10$^{-3}$/ 2 × 10$^{-5}$ | | |
| Alkali metal compound | | | |
| Kind a | sodium benzoate <PHCO$_2$Na> | — | — |
| Amount (part)/(molar equivalent/1 mol BPA*3) | 4.3 × 10$^{-4}$/ 3 × 10$^{-6}$ | | |
| Nitrogen-containing basic compound | | | |
| Kind | tetramethyl ammonium borohydride <(Me)$_4$NBH$_4$> | — | — |
| Amount (part)/(molar equivalent/1 mol BPA*4) | 8.9 × 10$^{-3}$/ 1 × 10$^{-4}$ | | |
| Physical properties of polymer | | | |
| Polymer color tone | | | |
| L value | 67 | 67 | 67 |
| b value | 1.5 | 1.6 | 1.6 |
| Filterability | Excellent | Excellent | Excellent |

TABLE 1-continued

| | | | |
|---|---|---|---|
| Amount of black foreign | Small | Small | Small |
| Gel evaluation (wt. %) | 9 | 26 | 25 |
| Polymerization activity | | | |
| Polymerization time (hour) | 5.5 | 8 | 8 |
| Productivity (–) | 4 | 3 | 3 |

| | Example | | |
|---|---|---|---|
| | 31 | 32 | 33 |
| Catalyst | | | |
| Component from element of group 14 | | | |
| Kind | tetrasodium orthosilicate <$Na_4SiO_4$> | sodium stannate.$4H_2O$ <$Na_2SnO_3.4H_2O$> | monosodium orthogermanate <$NaOGe(OH)_3$> |
| Amount (part)/(molar equivalent/1 mol BPA*1) | $9.2 \times 10^{-5}$/ $2 \times 10^{-6}$ | $6.7 \times 10^{-4}$/ $5 \times 10^{-6}$ | $8.1 \times 10^{-4}$/ $5 \times 10^{-6}$ |
| Kind | silicon dioxide <$SiO_2$> | germanium dioxide <$GeO_2$> | germanium hydroxide <$Ge(OH)_4$> |
| Amount (part)/(molar equivalent/1 mol BPA*2) | $6 \times 10^{-4}$/ $1 \times 10^{-5}$ | $1.0 \times 10^{-3}$/ $1 \times 10^{-5}$ | $1.4 \times 10^{-3}$/ $1 \times 10^{-5}$ |
| Alkali metal compound | | | |
| Kind | — | — | — |
| Amount (part)/(molar equivalent/1 mol BPA*3) | — | — | — |
| Nitrogen-containing basic compound | | | |
| Kind | TMAH | TMAH | TMAH |
| Amount (part)/(molar equivalent/1 mol BPA*4) | $9.1 \times 10^{-3}$/ $1 \times 10^{-4}$ | $9.1 \times 10^{-3}$/ $1 \times 10^{-4}$ | $9.1 \times 10^{-3}$/ $1 \times 10^{-4}$ |
| Physical properties of polymer | | | |
| Polymer color tone | | | |
| L value | 68 | 65 | 66 |
| b value | 1.4 | 1.8 | 1.9 |
| Filterability | Excellent | Excellent | Excellent |
| Amount of black foreign matter | Small | Small | Small |
| Gel evaluation (wt. %) | 20 | 5 | 4 |
| Polymerization activity | | | |
| Polymerization time (hour) | 5.5 | 5.5 | 5.5 |
| Productivity (–) | 4 | 4 | 4 |

TABLE 2

| Comparative Example | 1 | 2 | 3 | 4 |
|---|---|---|---|---|
| Component from element of group 14 | | | | |
| Kind | — | — | — | — |
| Amount (part)/(molar equivalent/1 mol BPA*1) | — | — | — | — |
| Kind | — | — | — | — |
| Amount (part)/(molar equivalent/1 mol BPA*2) | — | — | — | — |
| Alkali metal compound | | | | |
| Kind | sodium hydroxide <NaOH> | sodium hydroxide <NAOH> | sodium hydroxide <NAOH> | sodium salt of bisphenol-A |
| Amount (part)/(molar equivalent/1 mol BPA*3) | $4 \times 10^{-5}$/ $1 \times 10^{-6}$ | $2 \times 10^{-4}$/ $5 \times 10^{-6}$ | $4 \times 10^{-5}$/ $1 \times 10^{-6}$ | $6.8 \times 10^{-4}$/ $5 \times 10^{-6}$ |
| Nitrogen-containing basic compound | | | | |
| Kind | — | — | TMAH | TMAH |

TABLE 2-continued

| Comparative Example | 1 | 2 | 3 | 4 |
|---|---|---|---|---|
| Amount (part)/(molar equivalent/1 mol BPA*4) | — | — | $9.1 \times 10^{-3}/ 1 \times 10^{-4}$ | $9.1 \times 10^{-3}/ 1 \times 10^{-4}$ |
| Physical properties of polymer | | | | |
| Polymer color tone | | | | |
| L value | 67 | 68 | 67 | 68 |
| b value | 1.5 | 1.5 | 1.5 | 1.5 |
| Filterability | Slightly defective | Slightly defective | Excellent | Slightly defective |
| Amount of black foreign matter | Small | Medium | Small | Small |
| Gel evaluation (wt. %) | 10 | 85 | 10 | 90 |
| Polymerization activity | | | | |
| Polymerization time (hour) | above 12 | above 12 | above 12 | 8 |
| Productivity (–) | 1 | 1 | 1 | 3 |

What is claimed is:

1. A process for the production of an aromatic polycarbonate having an intrinsic viscosity, measured in methylene chloride at 20° C., of 0.1 to 1.0, which comprises polycondensing an aromatic dihydroxy compound and a diaryl carbonate in the presence, as a polycondensation catalyst, of at least one alkali metal salt selected from the group consisting of alkali metal salts of the following formula (II):

$$M^1M^2X^1_p(OR^6)_q \quad \text{(II)}$$

wherein $M^1$ is an alkali metal, $M^2$ is silicon, germanium, stannum or plumbum, $X^1$ is an alkyl group having 1 to 20 carbon atoms, a cycloalkyl group having 5 to 20 carbon atoms or an aryl group having 6 to 20 carbon atoms, $R^6$ is an alkyl group having 1 to 20 carbon atoms, a cycloalkyl group having 5 to 20 carbon atoms or an aryl group having 6 to 20 carbon atoms, and each of p and q is an integer of 0 or 1 to 5, provided that p+q equals 3 or 5, and alkali metal salts of oxoacids of an element selected from the group consisting of silicon, germanium, stannum and plumbum.

2. A process of claim 1, wherein the diaryl carbonate is di(substituted or nonsubstituted $C_{6-20}$ aryl) carbonate in which the $C_{6-20}$ aryl groups may be substituted by a substituent selected from the group consisting of an alkyl group having 1 to 5 carbon atoms, an alkoxy group having 1 to 5 carbon atoms, an alkylthio group having 1 to 5 carbon atoms and a halogen atom.

3. The process of claim 1, wherein the aromatic dihydroxy compound has the formula (I),

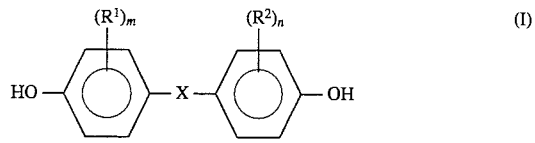

wherein X is

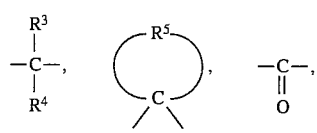

—O—, —S—, —SO—, —$SO_2$— or a single bond, each of $R^1$ and $R^2$ is independently a halogen atom, a hydrocarbon group having 1 to 12 carbon atoms, a hydrocarbon-O or —S group having 1 to 12 carbon atoms, each of $R^3$ and $R^4$ is independently a hydrogen atom, a halogen atom or a hydrocarbon group having 1 to 12 carbon atoms, $R^5$ is a hydrocarbon group having 4 to 20 carbon atoms, and each of m and n is independently an integer of 0 or 1 to 4.

4. The process of claim 1, wherein the alkali metal salt of oxoacid is selected from the group consisting of an alkali metal salt of silicic acid, an alkali metal salt of stannous acid, an alkali metal salt of stannic acid, an alkali metal salt of germanous acid, an alkali metal salt of germanic acid, an alkali metal salt of plumbous acid and an alkali metal salt of plumbic acid.

5. The process of claim 4, wherein the alkali metal salt of silicic acid is an acidic or normal alkali salt of monosilicic acid or its condensate.

6. The process of claim 4, wherein the alkali metal salt of stannous acid is an acidic or normal alkali metal salt of monostannous acid.

7. The process of claim 4, wherein the alkali metal salt of stannic acid is an acidic or normal salt of monostannic acid or its condensate.

8. The process of claim 4, wherein the alkali metal salt of germanous acid is an acidic or normal alkali metal salt of monogermanous acid or its condensate.

9. The process of claim 4, wherein the alkali metal salt of germanic acid is an acidic or normal alkali metal salt of monogermanic acid or its condensate.

10. The process of claim 4, wherein the alkali metal salt of plumbous acid is an acidic or normal alkali metal salt of monoplumbous acid.

11. The process of claim 4, wherein the alkali metal salt of plumbic acid is an acidic or normal acid of monoplumbic acid.

12. The process of claim 1, wherein the polycondensation catalyst is used in such an amount that the content of the alkali metal element in the polycondensation catalyst per mole of the aromatic dihydroxy compound is $1\times10^{-7}$ to $5\times10^{-5}$ equivalent.

13. The process of claim 1, wherein the polycondensation is carried out in the presence of at least one auxiliary catalyst selected from the group consisting of oxoacids and oxides of an element, said element being selected from the group consisting of silicon, germanium, stannum and plumbum.

14. The process of claim 13, wherein the oxoacid is selected from the group consisting of silicic acid, stannous acid, stannic acid, germanic acid, plumbous acid and plumbic acid.

15. The process of claim 13, wherein the oxide of selected from the group consisting of silicon monoxide, silicon dioxide, stannous oxide, stannic dioxide, germanium monoxide, germanium dioxide, plumbous oxide, plumbic dioxide and condensates of these.

16. The process of claim 13, wherein the auxiliary catalyst is used in such an amount that the amount of said element in the auxiliary catalyst per mole of the alkali metal element of the polycondensation catalyst is 50 moles or less.

17. The process of claim 16, wherein the auxiliary catalyst is used in such an amount that the amount of the metal element of the group 14 of the periodic table in the auxiliary catalyst per mole of the alkali metal element of the polycondensation catalyst is 0.1 to 30 moles.

18. The process of claim 1, wherein a nitrogen-containing basic compound is co-present as a cocatalyst.

19. The process of claim 18, wherein the nitrogen-containing basic compound has the formula (III), $$R^7R^8R^9R^{10}NX^2 \qquad (III)$$

wherein each of $R^7$, $R^8$, $R^9$ and $R^{10}$ is independently an alkyl group having 1 to 20 carbon atoms or a cycloalkyl, cycloalkylalkyl, aryl or aralkyl group having 6 to 20 carbon atoms, and $X^2$ is $OR^{11}$, $-OCOR^{12}$, $B(R^{13})_4$ or F in which $R^{11}$ is a hydrogen atom, an alkyl group having 1 to 20 carbon atoms or a cycloalkyl, cycloalkylalkyl, aryl or aralkyl group having 6 to 20 carbon atoms, $R^{12}$ is a hydrogen atom, an alkyl group having 1 to 20 carbon atoms or a cycloalkyl, cycloalkylalkyl, aryl or aralkyl group having 6 to 20 carbon atoms and $R^{13}$ is a hydrogen atom or an aryl group having 6 to 20 carbon atoms.

20. The process of claim 18, wherein the nitrogen-containing basic compound is used in such an amount that the content of ammonium nitrogen atom in the nitrogen-containing basic compound is $1\times10^{-5}$ to $1\times10^{-3}$ equivalent per mole of the aromatic dihydroxy compound.

21. The process of claim 13, wherein a nitrogen-containing basic compound is co-present as a co-catalyst.

22. The process of claim 21, wherein the nitrogen-containing basic compound has the formula (III), $$R^7R^8R^9R^{10}NX^2 \qquad (III)$$

wherein each of $R^7$, $R^8$, $R^9$ and $R^{10}$ is independently an alkyl group having 1 to 20 carbon atoms or a cycloalkyl, cycloalkylalkyl, aryl or aralkyl group having 6 to 20 carbon atoms, and $X^2$ is $OR^{11}$, $-OCOR^{12}$, $B(R^{13})_4$ or F in which $R^{11}$ is a hydrogen atom, an alkyl group having 1 to 20 carbon atoms or a cycloalkyl, cycloalkylalkyl, aryl or aralkyl group having 6 to 20 carbon atoms, $R^{12}$ is a hydrogen atom, an alkyl group having 1 to 20 carbon atoms or a cycloalkyl, cycloalkylalkyl, aryl or aralkyl group having 6 to 20 carbon atoms and $R^{13}$ is a hydrogen atom or an aryl group having 6 to 20 carbon atoms.

23. The process of claim 21, wherein the nitrogen-containing basic compound is used in such an amount that the content of ammonium nitrogen atom in the nitrogen-containing basic compound is $1\times10^{-5}$ to $1\times10^{-3}$ equivalent per mole of the aromatic dihydroxy compound.

* * * * *